United States Patent
Long et al.

(10) Patent No.: US 12,418,539 B2
(45) Date of Patent: Sep. 16, 2025

(54) RE-EXECUTING AN AUTHORIZATION PROCESS TO DETERMINE AN UPDATED SET OF AUTHORIZED ACTIONS THAT MAY BE INITIATED BY A COMPUTING ENTITY DURING A SESSION

(71) Applicant: Oracle International Corporation, Redwood Shores, CA (US)

(72) Inventors: Tony Long, Edmonds, WA (US); Krishna Sai Veera Reddy, Seattle, WA (US); Karthik Venkatesh, Bothell, WA (US); Philip Ramsey, Bainbridge Island, WA (US); Arsalan Ahmad, Snohomish, WA (US); Thomas James Andrews, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 18/539,987

(22) Filed: Dec. 14, 2023

(65) Prior Publication Data

US 2025/0202902 A1    Jun. 19, 2025

(51) Int. Cl.
  H04L 9/40        (2022.01)
(52) U.S. Cl.
  CPC .......... H04L 63/102 (2013.01); H04L 63/108 (2013.01); H04L 63/20 (2013.01)
(58) Field of Classification Search
  CPC ...... H04L 63/102; H04L 63/108; H04L 63/20
  See application file for complete search history.

(56) References Cited

U.S. PATENT DOCUMENTS

| | | |
|---|---|---|
| 9,164,864 B1 | 10/2015 | Novick et al. |
| 9,438,599 B1 | 9/2016 | Yuhan et al. |
| 10,394,638 B1 | 8/2019 | Lay et al. |
| 10,649,834 B2 | 5/2020 | Dhayapule et al. |

(Continued)

FOREIGN PATENT DOCUMENTS

| | | |
|---|---|---|
| EP | 3429156 A1 | 1/2019 |
| EP | 3271857 B1 | 4/2020 |
| WO | 2021/150306 A1 | 7/2021 |

OTHER PUBLICATIONS

"General Variables for All Requests", Jun. 28, 2023, pp. 6.

(Continued)

Primary Examiner — El Hadji M Sall
(74) Attorney, Agent, or Firm — Invoke

(57) ABSTRACT

A system executes an authorization process for initiating a session with a computing entity. Executing the authorization process includes determining an identity associated with the computing entity, identifying a current set of access policies associated with the identity, and determining, based on the current set of access policies, a first set of actions that the computing entity is authorized to perform. While executing the session, the system executes a first action in accordance with the current set of access policies. Subsequent to executing the first action, the set of access policies is modified. The system detects an occurrence of a trigger condition, and in response, re-executes the authorization process for the session, including determining, based on the modified set of access policies, a second set of actions the computing entity is authorized to perform that differs from the first set of actions.

25 Claims, 10 Drawing Sheets

(56) References Cited

U.S. PATENT DOCUMENTS

| | | | |
|---|---|---|---|
| 10,878,483 | B1 | 12/2020 | Felbinger et al. |
| 10,992,540 | B1 | 4/2021 | Kandaswamy et al. |
| 11,356,273 | B1* | 6/2022 | Patel .................. H04L 9/088 |
| 2006/0230281 | A1* | 10/2006 | Hofmann .......... G06F 21/6218 |
| | | | 713/182 |
| 2007/0179859 | A1* | 8/2007 | Chan .................. G06Q 30/0635 |
| | | | 705/26.81 |
| 2008/0295095 | A1 | 11/2008 | Watanabe et al. |
| 2013/0054426 | A1 | 2/2013 | Rowland et al. |
| 2013/0297802 | A1 | 11/2013 | Laribi et al. |
| 2014/0156846 | A1 | 6/2014 | Stern et al. |
| 2015/0363852 | A1 | 12/2015 | Vautour |
| 2016/0043909 | A1 | 2/2016 | Pogrebinsky et al. |
| 2016/0080479 | A1 | 3/2016 | Zhang et al. |
| 2016/0203533 | A1 | 7/2016 | Cheng et al. |
| 2016/0277411 | A1 | 9/2016 | Dani et al. |
| 2017/0230229 | A1 | 8/2017 | Sasturkar et al. |
| 2018/0173510 | A1 | 6/2018 | Koshkin et al. |
| 2018/0288063 | A1* | 10/2018 | Koottayi ................. G06F 21/50 |
| 2018/0367542 | A1* | 12/2018 | Wolf ...................... H04L 63/102 |
| 2019/0036797 | A1 | 1/2019 | Margalit et al. |
| 2019/0087835 | A1 | 3/2019 | Schwed et al. |
| 2019/0155674 | A1 | 5/2019 | Dhayapule et al. |
| 2019/0349426 | A1 | 11/2019 | Smith et al. |
| 2020/0112497 | A1 | 4/2020 | Yenumulapalli et al. |
| 2020/0134223 | A1 | 4/2020 | Ye et al. |
| 2020/0236096 | A1 | 7/2020 | Zhu et al. |
| 2020/0285496 | A1 | 9/2020 | Cropper et al. |
| 2020/0285737 | A1* | 9/2020 | Kraus ................... G06F 21/552 |
| 2020/0358617 | A1 | 11/2020 | Baierlein et al. |
| 2021/0144440 | A1 | 5/2021 | Li et al. |
| 2021/0216190 | A1 | 7/2021 | Vakil et al. |
| 2021/0234864 | A1 | 7/2021 | Dube et al. |
| 2021/0377272 | A1 | 12/2021 | Dasari et al. |
| 2022/0255902 | A1 | 8/2022 | Woodson |
| 2023/0032585 | A1 | 2/2023 | Jeuk et al. |
| 2023/0126757 | A1 | 4/2023 | Roy et al. |
| 2024/0054063 | A1 | 2/2024 | Wichelman et al. |
| 2024/0095739 | A1 | 3/2024 | Adogla et al. |
| 2024/0160517 | A1 | 5/2024 | Fischer et al. |
| 2024/0259389 | A1* | 8/2024 | Wu ....................... H04L 63/105 |
| 2024/0386054 | A1 | 11/2024 | Wouhaybi et al. |

OTHER PUBLICATIONS

"Policy Syntax", Jan. 4, 2023, pp. 7.

"Verbs", Jun. 5, 2023, pp. 2.

"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.

"Overview of Access Approval", Retrieved from https://cloud.google.com/assured-workloads/access-approval/docs/overview, Jun. 6, 2024, pp. 5.

"Reinstate admin privileges for a customer's Azure CSP subscriptions", Retrieved from https://learn.microsoft.com/en-us/partner-center/reinstate-csp, Aug. 1, 2023, pp. 7.

"Tenant administrator settings", Retrieved from https://backstage.forgerock.com/docs/idcloud/latest/tenants/tenant-administrator-settings.html, Jun. 7, 2023, pp. 12.

Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, p. 8.

Ducharme et al., "Seamlessly Protect Your IBM Cloud Application Infrastructure with Privileged Access Gateway", Oct. 3, 2022, pp. 13.

Anonymbus: "Tokenization—(data security)", Wikipedia, Feb. 1'2, 2023, pp. 1-12.

George et al., "Data anonymization and integrity checking in cloud computing", 2013 Fourth International Conference on Computing, Communications and Networking Technologies (ICCCNT), Jul. 2013, pp. 5.

Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

"IBM SmartCloud: Becoming a Cloud Service Provider", IBM, Dec. 13, 2012, <https://www.redbooks.ibm.com/abstracts/redp4912.html> (Year: 2012).

* cited by examiner

RE-EXECUTING AN AUTHORIZATION PROCESS TO DETERMINE AN UPDATED SET OF AUTHORIZED ACTIONS THAT MAY BE INITIATED BY A COMPUTING ENTITY DURING A SESSION

TECHNICAL FIELD

The present disclosure relates to authorization processes for determining authorized actions that may be initiated by a computing entity during a session. More particularly, the present disclosure relates to re-executing authorization processes during the session to determine updated sets of authorized actions that may be initiated by the computing entity.

BACKGROUND

Access to target resources on a cloud computing network may be based on access policies that define permissions granted to various identities associated with various computing entities. When a computing entity requests to access a target resource, a system may determine whether one or more access policies corresponding to an identity associated with the computing entity include a permission to access the target resource. The system may authorize the computing entity to access a target resource based on one or more access policies corresponding to an identity associated with the computing entity. The identities and corresponding access policies may be managed by an identity access management (IAM) system.

An access control service may execute an authorization process to determine, for example, from one or more access policies in the IAM system, whether the one or more access policies include a permission for the computing entity to access the target resource to perform a requested action. If the one or more access policies include a permission that encompasses the requested action, the system may authorize the computing entity to access the target resource and perform the requested action in accordance with the one or more access policies. If the permissions in the one or more access policies do not encompass the requested action, the system denies the computing entity from accessing the target resource, thereby ensuring that actions performed with respect to the target resource align with the permissions defined by the access policies.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
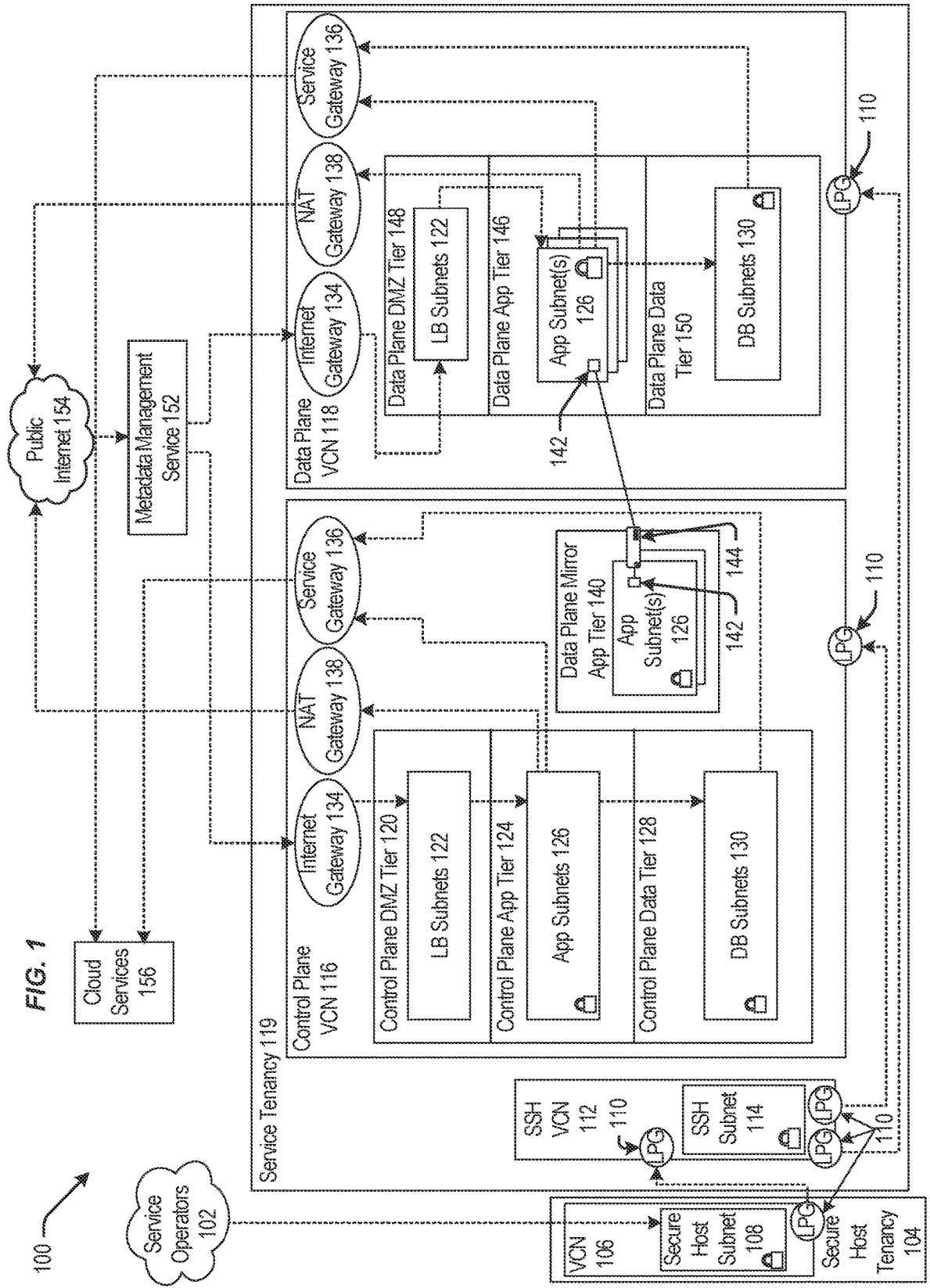
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. GENERAL OVERVIEW
2. DEFINITIONS
3. CLOUD COMPUTING TECHNOLOGY
4. COMPUTER SYSTEM
5. ARCHITECTURAL OVERVIEW
6. EXAMPLE OPERATIONS
7. MISCELLANEOUS; EXTENSIONS

1. GENERAL OVERVIEW

A system may execute an authentication process to authenticate an identity of a computing device for a session. Furthermore, a system may execute an authorization process to determine a set of authorized actions that may be initiated by the computing entity during the session. One or more embodiments periodically or intermittently re-execute the authorization process during a session to determine a set of authorized actions for a computing entity. Each execution of the authorization process may, for example, be triggered in response to the passage of a time interval and/or the detection of triggering events. Each execution of the authorization process is based on a current set of access policies. The access policies may correspond to an identity associated with the computing entity. The identity associated with the computing entity may include a principal, such as a user principal, an instance principal, or a resource principal. Additionally, or alternatively, the identity associated with the computing entity may include at least one of: an identity associated with a user using a computing device, an identity associated with a computing device, or an identity associated with a resource executing or instantiated on a computing device. The set of access policies may be modified during execution of the authenticated session. Accordingly, different executions of the authorization process during the same authenticated session may result in the determination of different sets of authorized actions.

In one example, a system may execute an authorization process based on a current set of access policies to initially determine that a computing entity is authorized to execute a particular action. Based on the initial determination, the computing entity executes (or initiates execution of) the particular action. Subsequent to executing the particular action, the access policies are modified to indicate that the computing entity is no longer authorized to execute the particular action. When the system re-executes the authorization process for the computing entity based on the modified access policies, the system determines that the computing entity is no longer authorized to execute the particular action but is authorized to execute other actions. In response to the determination that the computing entity is no longer authorized to execute the particular action, the system blocks or rejects any attempts by the computing entity to execute (or initiate execution of) the particular action. The system allows for the execution of the other actions by the computing entity based on the determination that the computing entity is authorized to execute the other actions.

In one example, prior to executing the session, the system may execute an authentication process to authenticate the identity associated with a computing entity based on identity information. The system may store the identity information in a cache memory. When executing the reauthorization process, the system may retrieve the identity information from the cache memory and may execute the reauthorization process based at least on the authentication information from the cache memory. As a result, the system may execute the reauthorization process without relying on further communication with the computing entity after the initial authentication process.

One or more embodiments described in this Specification and/or recited in the claims may not be included in this General Overview section.

2. DEFINITIONS

As used herein, the term "principal" refers to an identity of an entity that interacts with and accesses cloud resources or services. A principal may be utilized by an IAM system to uniquely identify and/or authenticate the identity of the entity represented by the principal. The principal may be associated with one or more access policies that define what actions associated with the principal are to be allowed or denied by the IAM system. As examples, the entity associated with a principal may include a user, a device, a resource, or a service. A principal may include a user principal, a resource principal, a service principal, a device principal, a role principal, or a group principal. A user principal may represent an identity of an individual user. A user principal may be associated with a customer, a tenant, a cloud provider, or a cloud operator. A resource principal may represent an identity of a computing entity or resource. A service principal may represent an identity of application or a service. A device principal may represent an identity of a particular computing device. A role principal may represent an identity of a specific role or set of responsibilities within an organization or system. A group principal may represent an identity of a group of users or other principals. A group principal may be used to uniquely identify and/or authenticate the group. A group principal may be used to simplify access control by providing access control policies that are to be applied to a group of users or other principles, rather than individual users or other principals.

As used herein, the term "identity credential" refers to a credential issued to a principal or to a computing entity associated with a principal that identifies a principal associated with one or more access policies in an IAM system. The one or more access policies in the IAM system are granted to the principal to enable the principal or an entity associated with the principal to access a target resource. In one example, an identity credential may include a token or a digital certificate. An identity credential may include a principal-identifier that uniquely identifies a principal in the IAM system. The principal-identifier can be associated with one or more access policies corresponding to one or more target resource. An identity credential may include a public key that corresponds to a private key associated with the principal and/or the computing entity. The public key and the private key may represent an asymmetric key pair. An access request that includes the identity credential may be digitally signed using the private key. This ensures that the identity credential can be used only by the specific principal that holds the private key.

As used herein, the term "access policy" refers to a set of one or more rules, permissions, or configurations that define what actions are allowed or denied for a particular principal with respect to particular resources within a computing network such as a virtual cloud network. An access policy may be managed by an IAM system. The IAM System may include one or more access policies associated with a particular principal. Additionally, or alternatively, the IAM system may include one or more access policies corresponding to a particular resource. An access policy may be associated with one or more compartments of a virtual cloud network. Additionally, or alternatively, an access policy may be associated with one or more logical containers of a particular compartment.

As used herein, the term "compartment" refers to a set of one or more logical containers utilized to organize and segregate resources, services, and/or permissions of a cloud computing environment.

As used herein, the term "logical container" refers to a virtual structure used to organize and manage cloud resources, services, or data.

As used herein, the term "target resource" refers to a cloud resource that may be accessed based on one or more access policies in an IAM system. As examples, a target resource may include one or more of: virtual machines, databases, services, data storage resources, containers, compartments, or networking resources.

As used herein, the term "tenant" refers to an entity that receives cloud computing services provided by a cloud provider.

As used herein, the term "cloud provider" or "service provider" refers to a provider of cloud computing services, such as an Infrastructure as a Service and/or one or more target services located on a cloud provider infrastructure.

As used herein, the term "cloud operator" refers to an entity that maintains cloud infrastructure. A cloud operator may perform services on behalf of a cloud provider, such as provisioning, configuring, or managing cloud resources and related infrastructure. A cloud operator and a cloud provider may be different entities or the same entities.

As used herein, the term "customer" may refer to a tenant or an entity that receives services from a tenant.

As used herein, the term "on-premises network" refers to a network infrastructure or device that is located and operated within a physical premises or data center of a tenant.

As used herein, the term "multi-cloud environment" refers to a cloud computing strategy in which an organization uses and integrates services and resources from multiple cloud providers. In a multi-cloud environment, an organization may simultaneously utilize the infrastructure, platform, or software services of two or more cloud providers rather than relying on a single cloud provider for all its cloud needs. Additionally, or alternatively, in a multi-cloud environment, a first cloud provider may be a customer or a client with respect to a second cloud provider.

As used herein, the term "network entity" refers to a device, component, or element within a computer network and/or cloud infrastructure. A network entity may be implemented in hardware and/or software.

As used herein, the term "asymmetric key pair" refers to a public key and a private key that are associated with one another such that a digital signature or an encryption generated using the private key may be validated or decrypted using the public key.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key using cryptography. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

As used herein, the term "token" refers to a data element that serves as proof of an identity. A token may have an expiration and may generally have a short period the token may be utilized. In one example, a token may have a time-based expiry such that the token expires after a period of time. Additionally, or alternatively, a token may have a session-based expiry such that the token expires when a session is terminated. In one example, a token may be issued in response to a token request process. The token request process may include sending a token request to an authorization server that includes an authentication credential, such as a digital certificate, an authorization code, or another token. In one example, a token may conform to an OAuth 2.0 protocol.

As used herein, the term "session" refers to a set of one or more data transmissions to or from a computing entity occurring during a validity period for an authentication of an identity associated with the computing entity. A session may include an open socket session or a closed socket session. A session may include a VPN (Virtual Private Network) session, a VPC (Virtual Private Cloud) session, a VLAN (Virtual LAN) session, a cloud API session, an application gateway session, a direct connection session, a BGP (Border Gateway Protocol) session, a load balancer session, a container orchestration session, a SDN (software-Defined Networking) session, a firewall session, a NAT (Network Address Translation) session, an HTTP session, a Telnet session, an SSH (Secure Shell) session, an FTP session, a database session, an API session, a Web session, a video session, a VoIP session, a virtual machine session, a streaming media session, or an online gaming session.

3. CLOUD COMPUTING TECHNOLOGY

Infrastructure as a Service (IaaS) is an application of cloud computing technology that can be configured to provide virtualized computing resources over a public network (e.g., the Internet). In an IaaS model, a cloud computing provider can host the infrastructure components, such as servers, storage devices, network nodes (e.g., hardware), deployment software, platform virtualization (e.g., a hypervisor layer), or the like. In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling Operating System (OS), middleware, and/or application deployment (e.g., on self-service virtual machines that can be spun up on demand) or the like.

In some examples, IaaS provisioning may refer to acquiring computers or virtual hosts for use and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up. Other infrastructure elements may also be provisioned, such as a virtual machine (VM) load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices that may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, that are Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, for example, Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. Furthermore, the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119, that may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may need to be applied to the resources contained in the data plane VCN 118. Via a VNIC 142, the control plane VCN 116 can directly communicate with the resources contained in the data plane VCN 118. The control plane VCN 116 can thereby execute the changes, updates, or other suitable modifications to configure the resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both that may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 that may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119 that may be isolated from public Internet 154.

Figure 2:
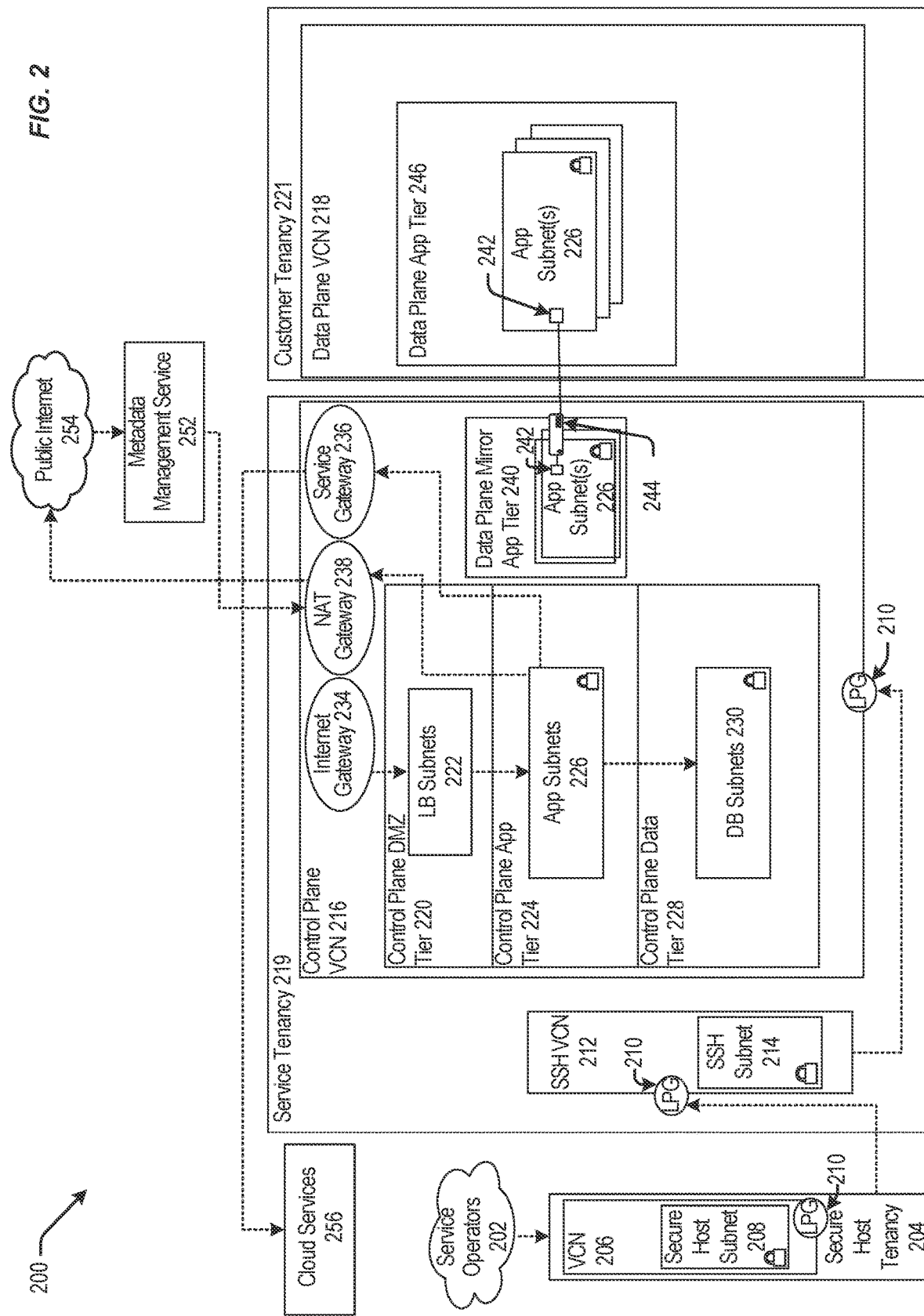

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1). The compute instance 244 may facilitate the communication via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources that are provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
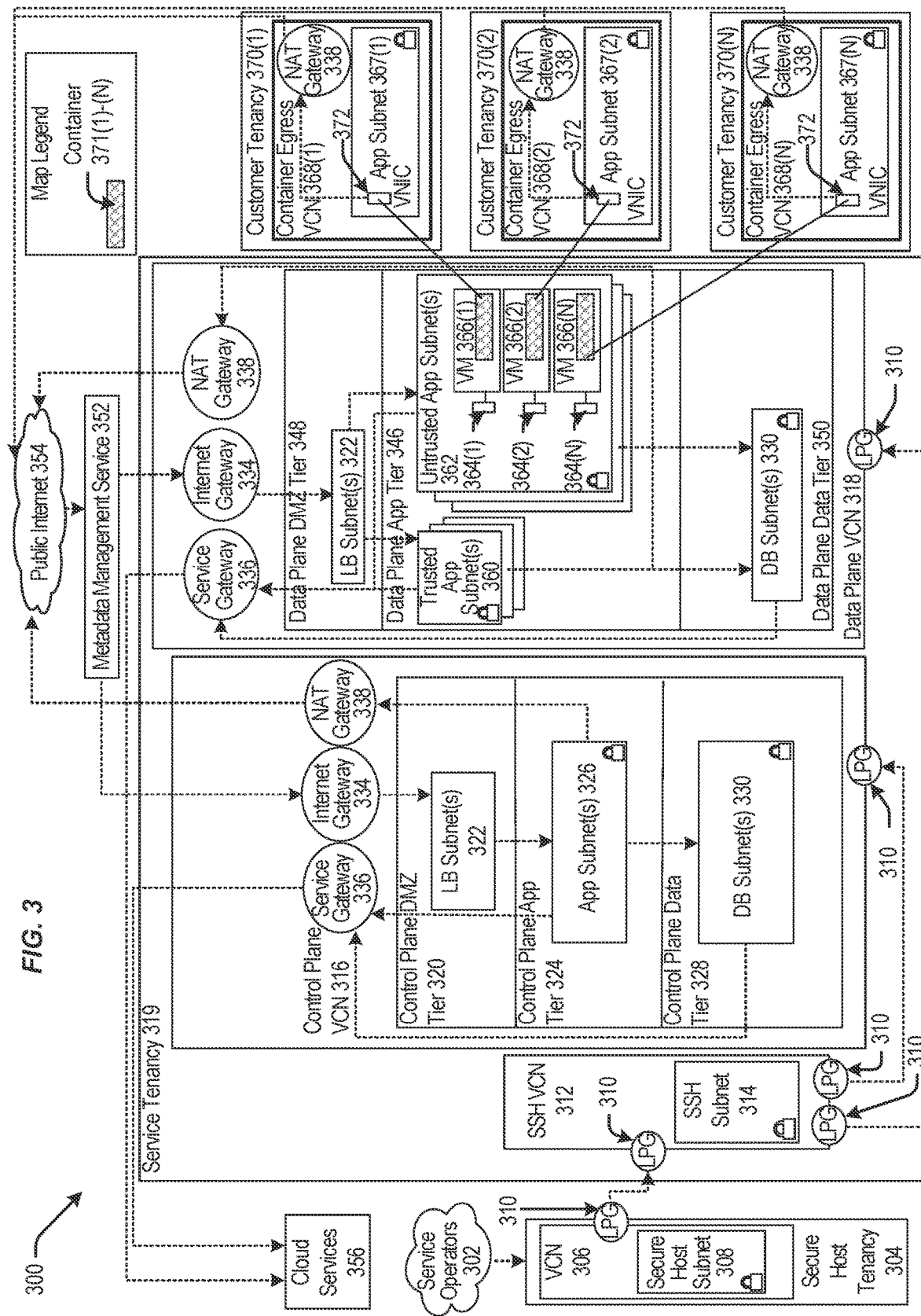

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316. Furthermore, the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation. For example, the containers 381(1)-(N) execute code, where the containers 381(1)-(N) may be contained in at least the VM 366(1)-(N) that are contained in the untrusted app subnet(s) 362). The dual isolation may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
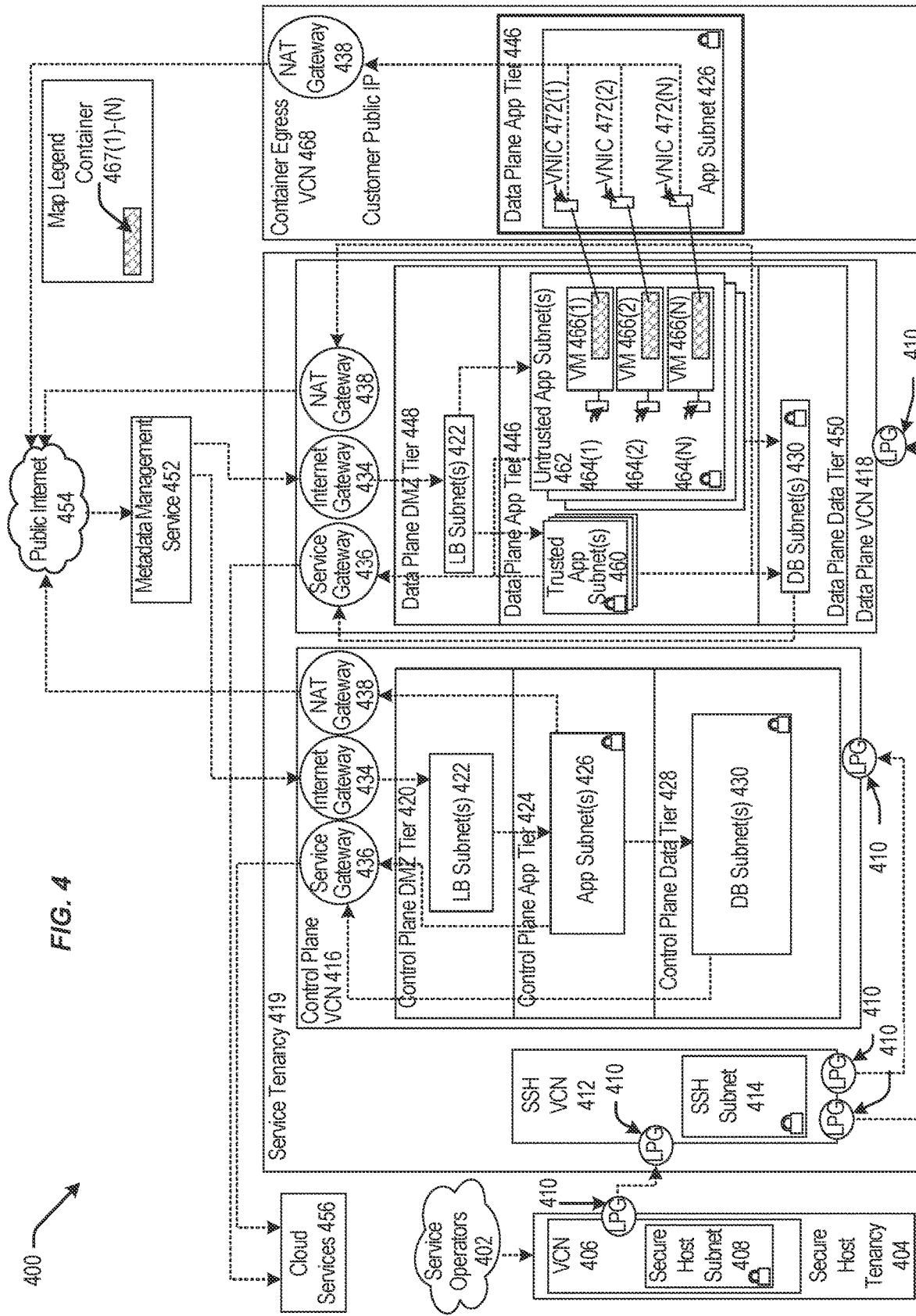

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416. Furthermore, the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications that execute on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent of each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates the tenants that have authorization to access corresponding applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. COMPUTER SYSTEM

Figure 5:
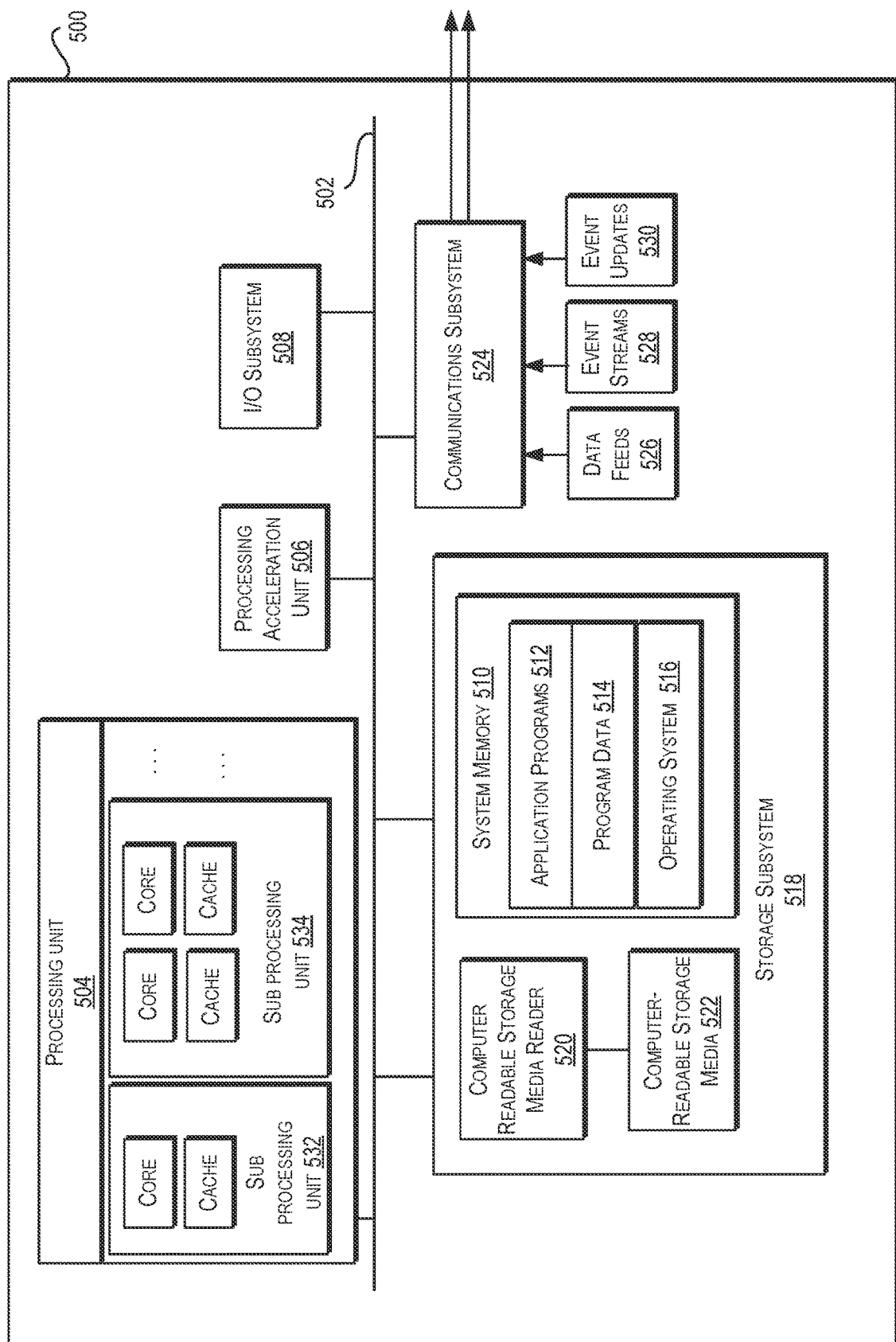
FIG. 5 is a hardware system in accordance with one or more embodiments.

FIG. 5 illustrates an example computer system 500 in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus that can be implemented as a Mezzanine bus manufactured to the IEEE P1386.1 standard.

Processing unit 504 that can be implemented as one or more integrated circuits (e.g., a conventional microprocessor or microcontroller) controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator) through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504, provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations, where computer system 500 executes one or more virtual machines, the virtual machines along with their guest operating systems (GOSs)

may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory such as flash-memory based SSDs, enterprise flash drives, solid state ROM, and the like, SSDs based on volatile memory, such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams that may include event streams 528 of real-time events and/or event updates 530 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. ARCHITECTURAL OVERVIEW

Figure 6A:
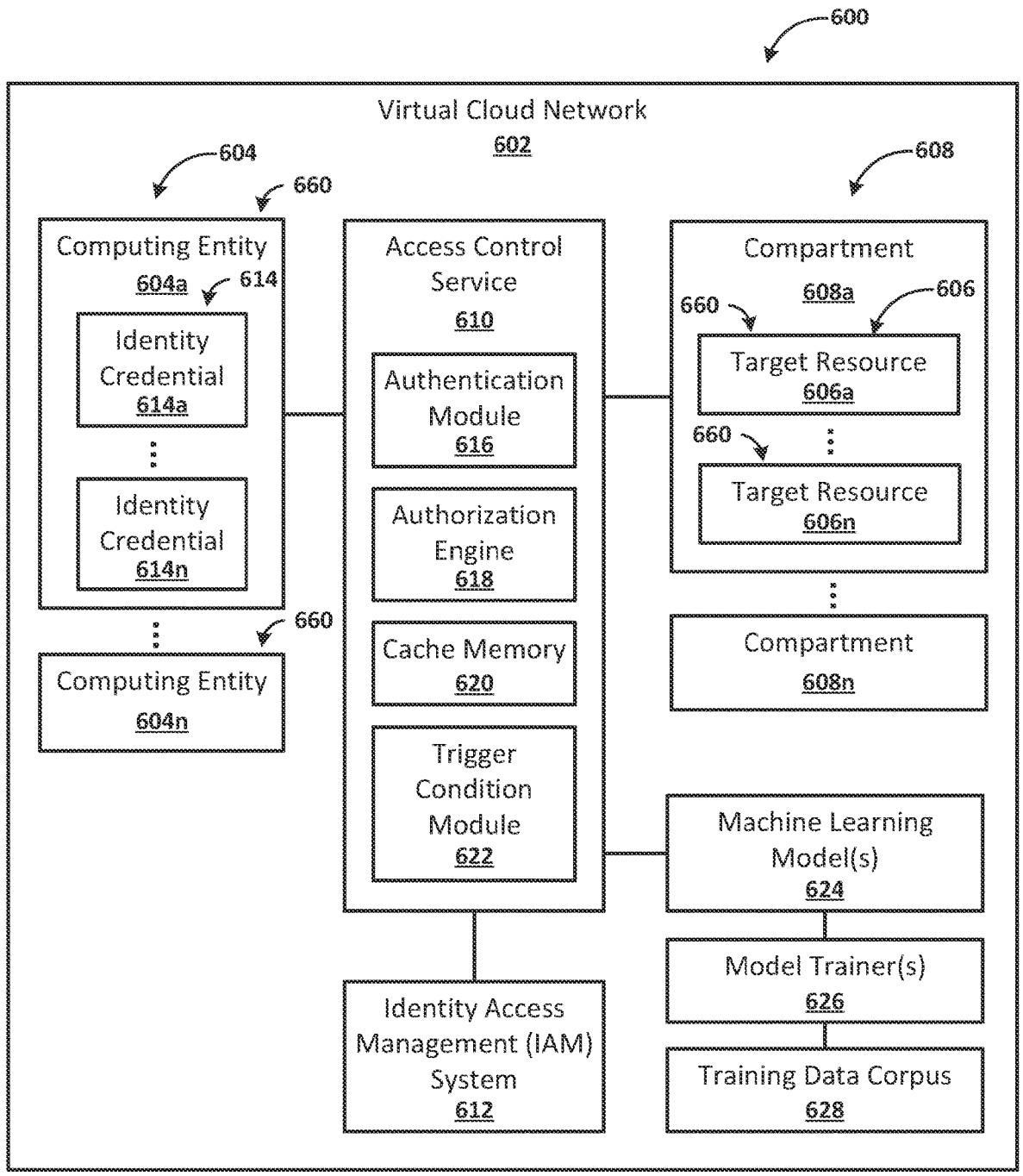
FIGS. 6A and 6B illustrate features of an example system in accordance with one or more embodiments.
Figure 6B:
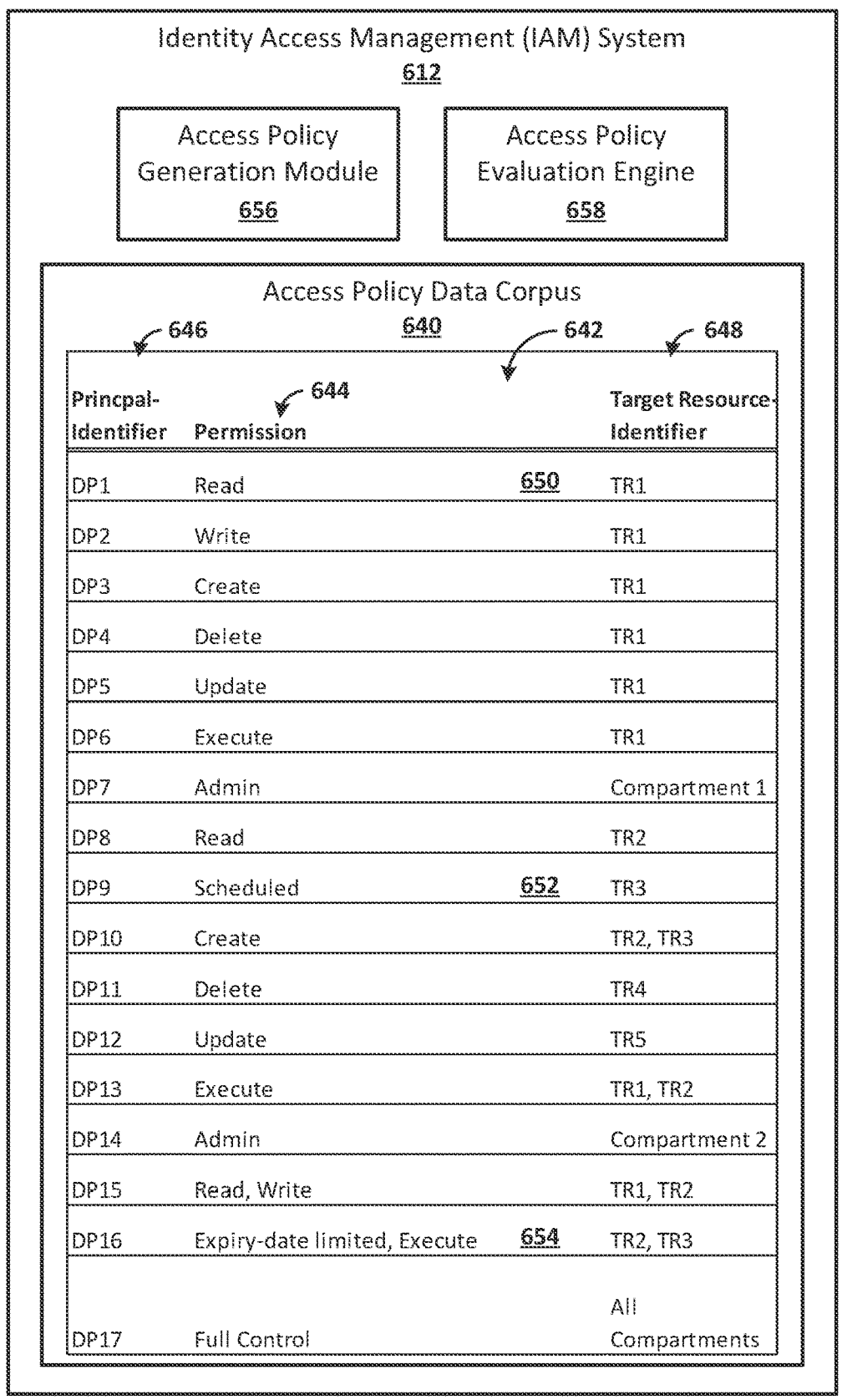

FIGS. 6A and 6B illustrate one example of a system 600 in accordance with one or more embodiments. The system 600 described with reference to FIGS. 6A and 6B may perform operations associated with executing authorization processes for determining actions that a computing entity is authorized to perform. Additionally, the system 600 described with reference to FIGS. 6A and 6B may perform operations associated with re-executing authorization processes.

As shown in FIG. 6A, the system 600 may include a virtual cloud network 602. The virtual cloud network 602 may include one or more computing entities 604 (such as computing entity 604a and computing entity 604n) and one or more target resources 606 (such as target resource 606a and target resource 606n). The target resources 606 may be located in one or more compartments 608, such as compartment 608a or compartment 608n. For example, as shown, target resource 606a and target resource 606n are located in compartment 608a. Further, the virtual cloud network 602 may include an access control service 610. The computing entities 604 may access the target resources 606 via the access control service 610. In one example, the access control service 610 may execute and/or re-execute authorization processes for determining actions that a computing entity 604 is authorized to perform with respect to one or more target resources 606.

The one or more computing entities 604 may be located within the virtual cloud network 602. Additionally, or alternatively, one or more computing entities 604 may be located external to the virtual cloud network 602. In one example, the virtual cloud network 602 may represent a portion of a multi-could network. For example, a first virtual cloud network (e.g., virtual cloud network 602) may be associated with a first cloud provider, and a second virtual cloud network (not shown) may be associated with a second cloud provider. The first virtual cloud network (e.g., virtual cloud network 602) may include one or more target resources 606, and the second virtual cloud network (not shown) may include one or more computing entities 604 that may access the one or more target resources 606. Additionally, or alternatively, the one or more computing entities 604 may be located on an on-premises network.

As shown in FIG. 6A, the one or more target resources 606 may be located within a compartment 608. Additionally, or alternatively, one or more target resources 606 may be located outside of a compartment 608 such as in a different portion of the virtual cloud network 602. In one example, a compartment 608 may be associated with a particular tenant. Additionally, or alternatively, a compartment 608 may be associated with cloud provider. A compartment 608 that is associated with a cloud provider may encompass one or more compartments 608 respectively associated with a particular tenant. Additionally, or alternatively, a compartment 608 associated with a cloud provider and one or more compartments 608 associated with various tenants may respectively represent separate portions of the virtual cloud network 602.

In one example, an access control service 610 may be located in a compartment 608 associated with a cloud provider. Additionally, or alternatively, an access control service may be located in a compartment 608 associated with a tenant and/or in a different portion of the virtual cloud network 602. In one example, an access control service 610 may perform operations pertaining to a particular set of one or more compartments 608 and/or a particular set of one or more target resources 606. Additionally, or alternatively, the virtual cloud network 602 may include a plurality of access control services 610, and each access control service 610 may respectively perform operations pertaining to a particular subset of one or more compartments 608 and/or a particular subset of one or more target resources 606.

In one example, the virtual cloud network 602 may include an IAM system 612. The IAM system 612 may manage and store access policies associated with various principals that represent an identity of an entity that interacts with and accesses cloud resources or services. The IAM system 612 may include, for a set of one or more principals, one or more access policies associated with the identity of a particular principal. The access policies may respectively define permissions or actions that are authorized or denied, for example, with respect to a respective principal. The access policies may be associated with a set of one or more target resources 606. Additionally, or alternatively, the access policies may be associated with one or more compartments of the virtual cloud network 602, such as a compartment where a particular set of target resource 606 are located.

A. Example Access Control Services.

To initiate a session, for example to access a target resource 606, a computing entity 604 may present an access request and an identity credential 614 to the access control service 610. The access request may include a request to access one or more target resources 606. The identity credential 614 may include an identity associated with the computing entity 604 and/or authentication information for authenticating the identity associated with the computing entity 604. The authentication information may include the identity included in the identity credential 614. The identity may identify a principal in the IAM system, for example, based on a principal identifier. Additionally, or alternatively, the authentication information may include the principal identifier that identifies the principal in the IAM system corresponding to the identity.

The access control service 610 may include an authentication module 616. The authentication module 616 may execute an authentication process that includes one or more authentication operations. The one or more authentication operations may include utilizing the authentication information to authenticate the identity associated with the computing entity. In one example, the authentication information may include a digital signature. The one or more authentication operations may include utilizing a public key to authenticate the digital signature. The public key may be included in the identity credential 614. Alternatively, the public key may be stored in a key repository accessible to the access control service 610.

After having executed the authentication process, including successfully authenticating the identity associated with the computing entity 604 and/or the identity credential 614, the access control service 610 may execute an authorization process for initiating a session with the computing entity 604. The access control service 610 may include an authorization engine 618, and the authorization process may be executed by the authorization engine 618. The authorization process may include a set of one or more authorization operations. The one or more authorization operations may include determining an identity associated with the computing entity, for example, based on the authorization information and/or the identity credential 614. Additionally, or alternatively, the one or more authorization operations may include identifying a set of access policies associated with the identity, for example, from the IAM system 612. The set of access policies may include one or more access policies, and the one or more authorization operations may include determining, based on the determined set of access policies, a set of one or more actions that the computing entity 604 is authorized to perform.

Upon having successfully executed the authorization process, including determining the set of one or more actions that the computing entity 604 is authorized to perform, the access control service 610 may initiate execution of the session in accordance with the determined set of access policies. The session may commence after the identity credential is successfully authenticated. The session may continue for a validity period. The validity period may end as a result of: a log-out, an inactivity timeout, a defined time period elapses, or the authentication credential expires. The session may include a set of one or more data transmissions occurring during the validity period for an authentication of the identity. The session may include continuous or intermittent data exchange. In one example, the session may include an open socket session or a closed socket session. The session may include a connection between the computing entity 604 and a target resource 606. In one example, the set of one or more actions may include receiving, at the computing entity 604, target data from the target resource 606. The target data received from the target resource 606 may include at least one of: text data, binary data, serialized data, structured data, query data, or sensor data. Text data may include plain text messages such as textual communication between the target resource and the computing entity 604. Binary data may include binary files, such as images, audio files, video files, or other non-textual data. Serialized data may include serialized objects or data structures. Structured data may include data structured according to JSON (JavaScript Object Notation) or Extensible Markup Language (XML). Query data may include database queries and/or response, such as SQL queries and/or data returned in response to SQL queries. Sensor data may include sensor readings, such as in connection with IoT (Internet of Things) applications, temperature sensors, humidity sensors, or GPS sensors.

The access control service 610 may store the identity credential 614 and/or the authentication information associated with the identity credential 614, for example, in a cache memory 620 associated with the access control service 610. The access control service 610 may reference the identity credential 614 and/or the authentication information associated with the identity credential 614 when periodically or intermittently re-executing the authorization process. Additionally, or alternatively, the access control service 610 may store the determined set of access policies, and/or the set of one or more actions that the computing entity 604 is authorized to perform, for example, in the cache memory 620 associated with the access control service 610. The access control service 610 may reference the determined set of access policies and/or the set of one or more actions that the computing entity 604 is authorized to perform in response to requests from the computing entity to execute actions during the session.

The computing entity 604 may include one or more identity credentials 614 associated with the computing entity 604, such as identity credential 614a and identity credential 614n. Additionally or alternatively, each identity credential may represent an identity of a particular principal. In one example, identity credential 614a may represent a first principal that is authorized to perform a first set of actions, for example, with respect to a first set of target resources 606. Additionally, or alternatively, identity credential 614n may represent a second principal that is authorized to perform a second set of actions, for example, with respect to a second set of target resources 606. The set of actions that a computing entity 604 is authorized to perform may depend on the identity associated with the computing entity 604 that is presented to the access control service 610 when requesting to initiate a session. For example, when computing entity 604a presents identity credential 614a to the access control service 610, the computing entity 604a may be authorized to perform the first set of actions. Additionally, or alternatively, when computing entity 604a presents identity credential 614n to the access control service 610, the computing entity 604a may be authorized to perform the second set of actions.

The set of actions that a computing entity 604 is authorized to perform may change from time to time. In one example, various access policies may be added, removed, and/or modified from time-to-time, for example, to add, remove, and/or modify permissions associated with a particular principal. Changes to various access policies and/or permissions may include adding, removing, and/or modifying a set of one or more actions that a particular principal is authorized to perform in accordance with a particular permission and/or in accordance with a particular access policy. Additionally, or alternatively, changes to various access policies and/or permissions may include adding, removing, and/or modifying a set of one or more target resources and/or a set of one or more compartments that a particular principal is authorized to perform a set of one or more actions in accordance with a particular permission and/or in accordance with a particular access policy.

In one example, the set of access policies may change between occurrences of executing the authorization process. The access control service 610 may determine the set of one or more actions that the computing entity is authorized to perform based on the set of access policies determined as of the time when the authorization process is executed. When the authorization process is re-executed and the set of access policies have changed since the last time the authorization process was executed, the second set of one or more actions that the computing entity is authorized to perform may reflect an updated set of access policies determined when the authorization process is re-executed.

In one example, the access control service 610 may include a trigger condition module 622. The trigger condition module 622 may determine occurrences of trigger conditions for re-executing the authorization process. Upon the occurrence of a trigger condition, the access control service 610 may re-execute authorization process for the session. In one example, the trigger condition module 622 may instruct the authorization engine 618 to re-execute the authorization process in response to detecting an occurrence of a trigger condition. In one example, the trigger condition may include a particular period of time having passed since executing the authorization process. The access control service 610 may re-execute the authorization process responsive to determining that the particular period of time has passed. Additionally, or alternatively, the trigger condition may include detecting a modification of the current set of access policies. In one example, the trigger condition module 622 may periodically query the IAM system 612 for modifications to the current set of access policies. Additionally, or alternatively, the IAM system may transmit a notification to the trigger condition module 622 to indicate a modification to the current set of access policies. The notification may be transmitted upon the occurrence of a modification to the current set of access policies periodically and/or intermittently.

In one example, the trigger condition may include a request from the computing entity to execute an additional action such as an action that differs from a previous action. The previous action may be an action that the access control service 610 has already determined the computing entity is authorized to perform. The additional action may be an action that the access control service 610 has yet to determine whether the computing entity is authorized to perform the action. In one example, the trigger condition may include a request from the computing entity to execute a particular action from a set of one or more actions. For example, a computing entity 604 may request to execute a first action, of a first set of one or more actions, without giving rise to a trigger condition. Additionally, or alternatively, a trigger condition may include a request from the computing entity 604 to execute a second action of a second set of one or more actions. In one example, the second set of actions may include one or more sensitive actions, such as a delete action, or an action requested to be executed upon a sensitive target resource.

In one example, the trigger condition may include a change in one or more parameters. The one or more parameters may be associated with at least one of: the session, the computing entity 604, or a series of requests from the computing entity 604 to execute a set of actions. In one example, the change in the series of requests from the computing entity 604 may include a change in request frequency or a change in a characteristic of the requests such as the type of actions being requested. The trigger condition module 622 may flag the change in the series of requests as potential security risk and in response, the trigger condition module 622 may generate a trigger condition to prompt the access control service 610 to re-execute the authorization process.

B. Example Machine Learning Models.

Referring further to FIG. 6A, in one example, the virtual cloud network 602 may include one or more machine learning models 624. In one example, a machine learning model 624 may determine a trigger condition at least by applying a machine learning model 624 to a dataset that may include a plurality of session data elements. The session data elements may correspond to at least one authentication process or at least one authorization process. Additionally, or alternatively, the session data elements may include data pertaining to actions requested to be executed during the session and/or target resources accessed during the session. Additionally, or alternatively, the session data elements may include data pertaining to the computing entity 604 associated with the session and/or authentication information associated with the computing entity 604. The machine learning model may generate an output(s) based on the dataset. The output(s) may include a trigger condition. Additionally, or alternatively, a trigger condition may be determined based on the output(s).

A machine learning model 624 may include one or more machine-learning algorithms configured to determine a trigger condition for re-executing the authorization process. The machine learning model 624 may automatically learn relevant patterns and relationships based on session data elements, for example, without the need for manual selection of parameters for trigger conditions or strong assumptions about the session data elements. The one or more machine learning algorithms can be iterated to learn a target model f that best maps a set of input variables to an output variable. In particular, a machine learning algorithm may be configured to generate and/or train a machine learning model 624. A machine learning algorithm may be iterated to learn a target model f that best maps a set of input variables to an output variable using a set of training data.

A machine learning algorithm may generate a target model f such that the target model f best fits the datasets of training data to the labels of the training data. Additionally, or alternatively, a machine learning algorithm may generate a target model f such that when the target model f is applied to the datasets of the training data, a maximum number of results determined by the target model f matches the labels of the training data. Different target models may be generated based on different machine learning algorithms and/or different sets of training data. A machine learning algorithm may include supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, and random forest, boosting, backpropagation, and/or clustering.

In one example, the virtual cloud network 602 may include a model trainer 626 that includes one or more machine learning algorithms configured to generate and/or train a machine learning model 624. The model trainer 626 may obtain and/or generate feedback from one or more of the machine learning models 624. The feedback may correspond to one or more outputs of a machine learning model 624. The model trainer 626 may train, update, and/or retrain one or more of the machine learning models 624 based at least in part on the feedback. The feedback may correspond to one or more outputs of at least one machine learning model 624.

In one example, the model trainer 626 may obtain a plurality of training datasets such as from the training data corpus 628. The model trainer 626 may train a machine learning model 624 utilized by the access control service 610 based at least in part on the plurality of training datasets. In one example, the training data may include outputs from one or more of the machine learning models 624. For example, a machine learning model 624 may be iteratively trained and/or re-trained based at least in part on outputs generated by one or more of the machine learning models 624. A machine learning model 624 may be iteratively improved over time as additional datasets are analyzed by the machine learning model 624 to produce additional outputs, and the machine learning model 624 is iteratively trained or re-trained based on the additional outputs.

In one example, the training data may include one or more initial supervised learning datasets. The model trainer 626 may train a machine learning model 624 based at least in part on the one or more initial supervised learning datasets. For example, the model trainer 626 may initially train the machine learning model 624 to determine trigger conditions based on the one or more initial supervised learning datasets. In one example, the training data may include one or more subsequent supervised learning datasets. The model trainer 626 may update or retrain the machine learning model 624 based on one or more subsequent supervised learning datasets. The one or more subsequent supervised learning datasets may be generated based at least in part on feedback corresponding to one or more outputs of the machine learning model 624. In one example, the feedback may include data associated with one or more sessions. Additionally, or alternatively, the feedback may include data associated with one or more authorization processes and/or one or more authentication processes. In one example, the feedback may include a set of data elements corresponding to a set of authorization errors. The set of authorization errors may include a failed authentication process and/or a failed authorization process. A failed authentication process may include an erroneously successful authentication or an erroneously unsuccessful authentication. A failed authorization process may include an erroneously successful authorization or an erroneously unsuccessful authorization.

Training data used by a machine learning algorithm may be stored in a training data corpus 628. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithms, which in turn updates the target model f.

Additionally, or alternatively, to a machine learning model 624, the access control service 610 may utilize one or more classical models to determine a trigger condition for re-executing the authorization process. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

C. Example IAM Systems.

Referring to FIG. 6B, an example IAM system 612 is further described. As shown in FIG. 6B, an IAM system 612 may include an access policy data corpus 640. The access policy data corpus 640 may store one or more access policies 642. Each access policy 642 in the access policy data corpus 640 may include one or more permissions 644. The one or more permissions 644 may respectively identify characteristics and/or conditions of access to one or more compartments and/or target resources. As shown in FIG. 6B, the one or more permissions 644 may include at least one action permission. An action permission may identify one or more types of action that are allowed or denied. An action permission may include at least one of: read, write, create, delete, update, execute, modify, copy, move, rename, upload, or download. Additionally, or alternatively, the one or more permissions may include at least one temporal permission. A temporal permission may include at least one time-based condition on one or more types of access. A temporal permission may include at least one of: scheduled, session-based, time-duration, or expiry date-limited. A schedule permission may allow access according to a schedule. A session-based permission may allow access during a particular session such as a current session. A time-duration permission may allow access for a specified duration of time. An expiry date-permission may allow access until an expiry date.

Each access policy 642 may include at least one principal-identifier 646. A principal-identifier 646 may associate one or more principals with the access policy 642. Each access policy 642 may further include at least one target resource-identifier 648. A target resource-identifier 648 may associate one or more target resources 606 with the access policy 642. In one example, an access policy 642 may include at least one permission 644, at least one principal-identifier 646, and at least one target resource-identifier 648. An access policy 642 may indicate that a principal, identified by a principal-identifier 646, has at least one permission 644 that defines one or more characteristics or conditions of access to at least one target resource 606, identified by a target resource-identifier 648. The one or more characteristics or conditions of access may include one or more actions that a computing entity associated with the principal is authorized to perform.

In one example, as shown in FIG. 6B, a first access policy 650 may provide a first principal, identified by principal-identifier "DP1," with "Read" access to a first target resource 606, identified by target resource-identifier "TR1." Additionally, or alternatively, a second access policy 652 may provide a second principal, identified by principal-identifier "DP9," with "Scheduled" access to a set of one or more target resources 606 located within a compartment, identified by target resource-identifier "Compartment 1." Additionally, or alternatively, a third access policy 654 may provide a third principal, identified by principal-identifier "DP16," with "Expiry date-limited" access to perform "Execute" operations on a second target resource 606, identified by target resource-identifier "TR2," and a third target resource 606, identified by target resource-identifier "TR3."

Referring further to FIG. 6B, an IAM system 612 may include an access policy generation module 656 and/or an access policy evaluation module 658. The access policy generation module 656 may perform operations associated with generating and/or modifying access policies 642. The access policy evaluation module 658 may perform operations associated with determining a set of access policies 642 associated with an identity, for example, in connection with an authorization process.

In one example, the access policy evaluation module 658 may compare information from an access request to information in the access policy data corpus 640 to determine whether an access policy 642 in the access policy data corpus 640 corresponds to the information from the access request. Additionally, or alternatively, the access policy evaluation module 658 may obtain information from the access policy data corpus 640 for comparison to information from an access request, for example, to determine whether an access policy 642 in the access policy data corpus 640 corresponds to the information from the access request.

In one example, the access policy evaluation module 658 may transmit information from one or more access policies 642 to the access control service 610. The access control service 610 may determine one or more actions that the computing entity is authorized to perform based on information from the one or more access policies 642. Additionally, or alternatively, the access policy evaluation module 658 may determine a set of one or more actions that the computing entity is authorized to perform and may transmit the set of one or more actions to the access control service 610.

D. Example Network Entities.

Referring further to FIG. 6A, the system 600 may include a plurality of network entities 660. The plurality of network entities 660 may include a plurality of computing entities 604 and/or a plurality of target resources 606. The network entities 660 may be located throughout one or more virtual cloud networks 602. A network entity 660 may reside on a substrate network, an overlay network, or a network interface. A network entity 660 may be implemented in hardware and/or software. A network entity may include a node, a host, an agent, a service, a component, an endpoint, or other element. The plurality of network entities 660 may include one or more substrate entities, one or more interface entities, and/or one or more overlay entities.

As used herein, the term "substrate entity" refers to a network entity 660 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another and/or with other network entities 660 using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface or an interface service executing or executable on the network interface. A node on the network interface may include a programmable hardware component, a memory component, or a gateway component. In one example, a network interface may include a network interface card such as a smartNIC. Additionally, or alternatively, a network interface may include a node or an endpoint on a network interface card or smartNIC.

A gateway component may provide connectivity between the substrate network and the network interface and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or alternatively, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service, such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

The plurality of network entities 660 may include a plurality of data repositories. Each of the data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Further, one or more of the data repositories may be implemented or executed on the same computing system as virtual cloud network 602. Additionally, or alternatively, one or more of the data repositories may be implemented or executed on a computing system separate from virtual cloud network 602.

In one or more embodiments, the system 600 may include more or fewer components than the components illustrated in FIGS. 6A and 6B. The components illustrated in FIGS. 6A and 6B may be local to or remote from each other. The components illustrated in FIGS. 6A and 6B may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. EXAMPLE OPERATIONS

Figure 7A:
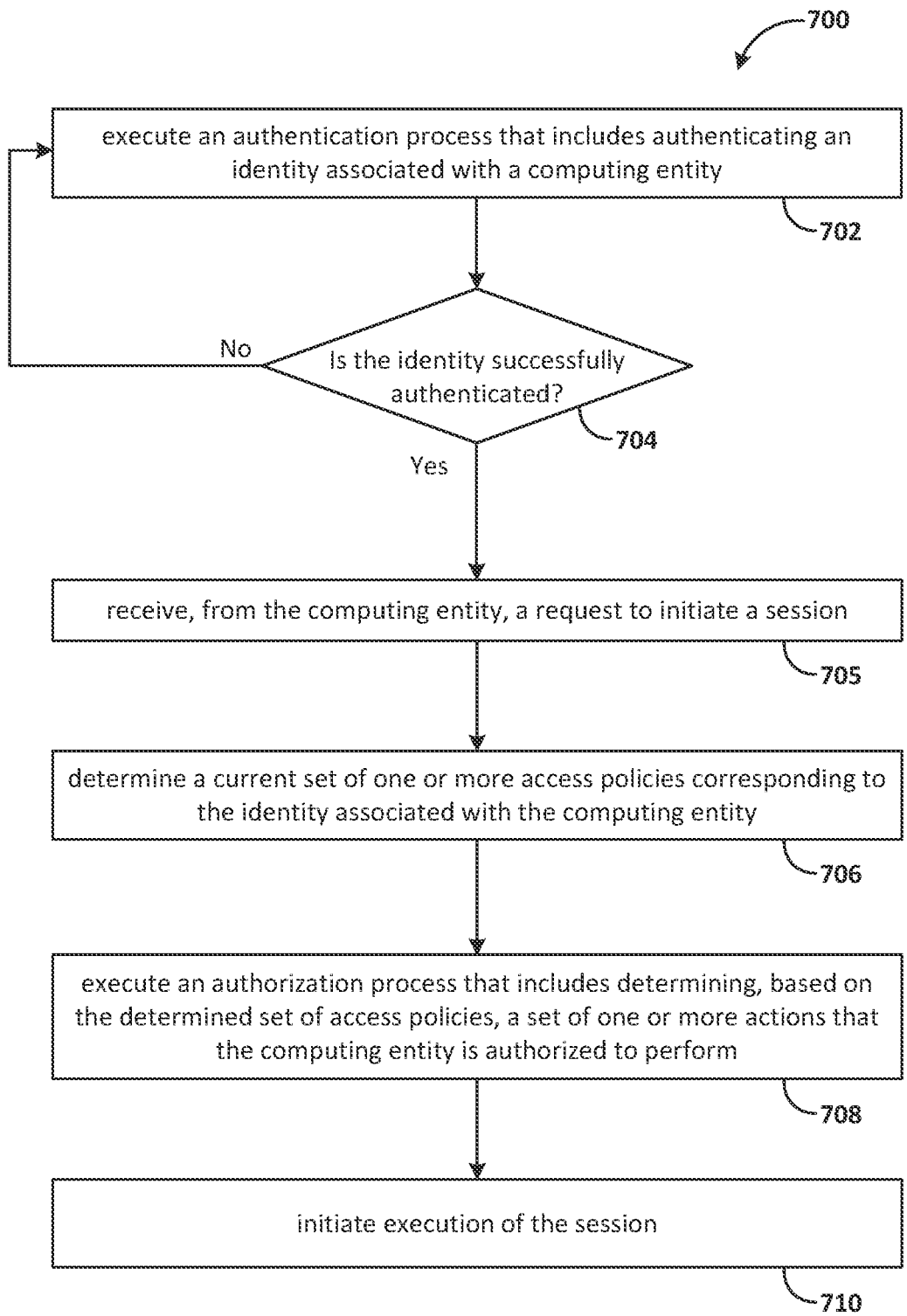
FIG. 7A is a flowchart that illustrates example operations pertaining to executing an authorization process in connection with initiating execution of a session for a computing entity to perform a set of one or more actions in accordance with a set of one or more access policies associated with the computing entity.
Figure 7B:
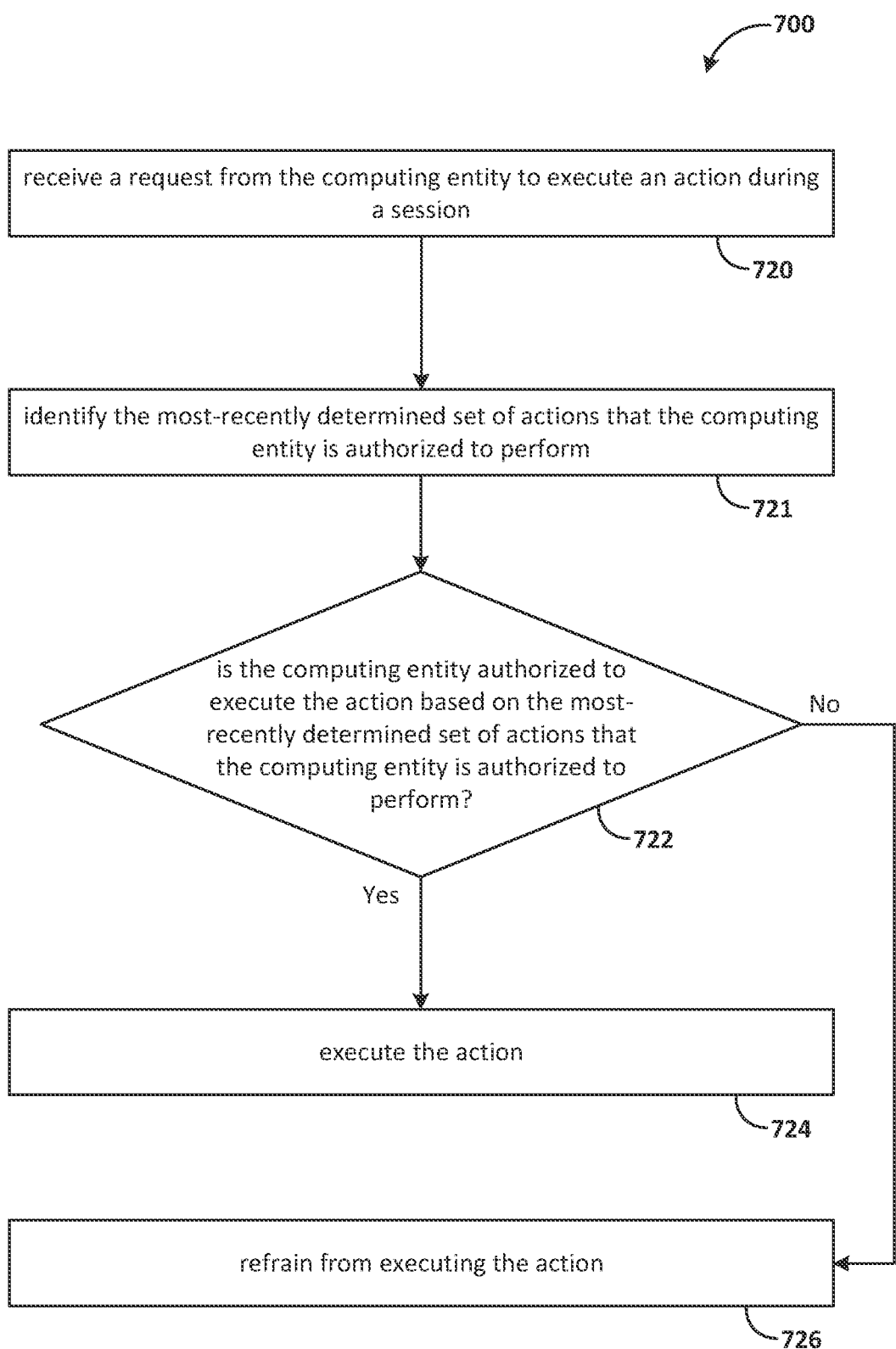
FIG. 7B is a flowchart that illustrates example operations pertaining to determining whether the computing entity is authorized to execute an action based on the most-recently determined set of actions.
Figure 7C:
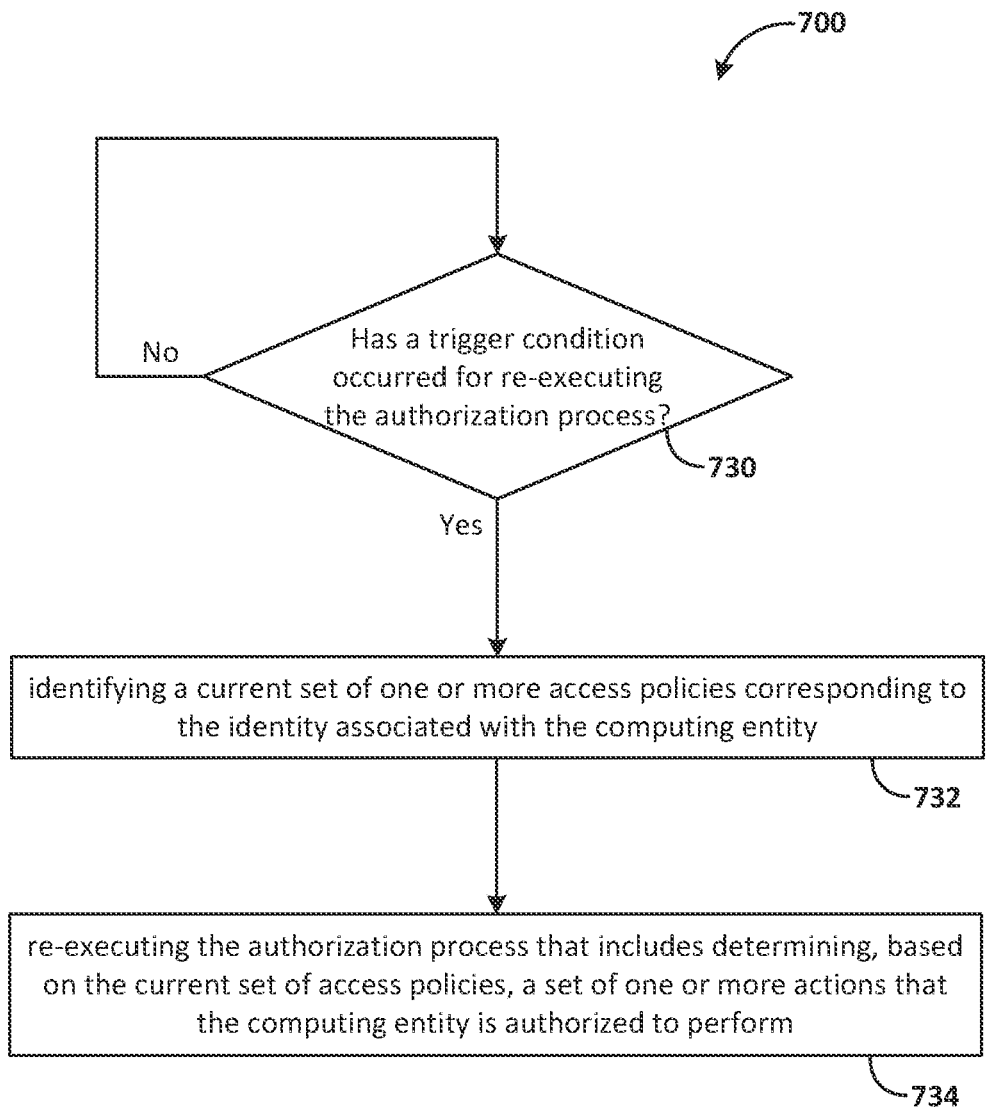
FIG. 7C is a flowchart that illustrates example operations pertaining to re-executing an authorization process for determining the set of actions that the computing entity is authorized to perform based on the current set of access policies corresponding to the identity associated with the computing entity.

Referring now to FIGS. 7A-7C, operations 700 pertaining to executing an authorization process are further described. The operations 700 pertaining to executing the authorization process may include determining a set of action that a computing entity is authorized to perform based on a set of access policies corresponding to an identity associated with the computing entity. Additionally, or alternatively, the operations 700 may include re-executing authorization processes. The operations 700 described with reference to FIG. 7A include operations pertaining to executing an authorization process in connection with initiating execution of a session for a computing entity. During the session, the computing entity may perform a set of one or more actions in accordance with a set of one or more access policies associated with the computing entity. The operations 700 described with reference to FIG. 7B include operations pertaining to determining whether the computing entity is authorized to execute an action based on the most-recently determined set of actions. The operations 700 described with reference to FIG. 7C include operations pertaining to re-executing an authorization process for determining the current set of actions that the computing entity is authorized to perform. The current set of actions that the computing entity is authorized to perform may be determined based on the current set of access policies corresponding to the identity associated with the computing entity. The current set of actions that the computing entity is authorized to perform may change as a result of changes to the set of access policies since the authorization process was previously executed. One or more operations 700 described with reference to FIGS. 7A-7C may be modified, combined, rearranged, or omitted all together. Accordingly, the particular sequence of operations 700 described with reference to FIGS. 7A-7C should not be construed as limiting the scope of one or more embodiments. In one example, the operations 700 may be performed by the one or more components of the system described with reference to FIGS. 6A and 6B.

Referring to FIG. 7A, operations pertaining to executing an authorization process in connection with initiating execution of a session for a computing entity are further described. The operations 700 may include operations pertaining to an authentication process and/or an authorization process prior to initiating execution of a session. As shown in FIG. 7A, the operations 700 may include, at block 702, executing an authentication process. The authentication process may be executed for initiating a session with a computing entity. The session may include the computing entity accessing one or more target resources. The authentication process may include authenticating an identity associated with a computing entity. In one example, the authentication process may include receiving an identity credential from the computing entity and authenticating the identity credential. The identity credential may be associated with the computing entity and/or the identity. The identity associated with a computing entity may be authenticated based at least on the identity credential. In one example, the identity credential may include a digital signature generated using a private key of an asymmetric key pair associated with the computing entity and/or the identity. The digital signature may be authenticated against a public key of the asymmetric key pair. Additionally, or alternatively, the identity credential may identify the identity, and the identity identified by the identity credential may be authenticated against a set of identities identified in the IAM system.

At block 704, the operations 700 may include determining whether the identity associated with the computing entity is successfully authenticated. In one example, the identity associated with the computing entity is successfully authenticated when a digital signature corresponding to the identity credential is successfully decrypted using a public key corresponding to the private key utilized to generate the digital signature. Additionally, or alternatively, the identity associated with the computing entity is successfully authenticated when the identity identified by the identity credential matches an identity identified in the IAM system. When an identity associated with the computing entity is successfully authenticated, the operations 700 may proceed to block 706. When authentication of the identity associated with the computing entity is unsuccessful, the operations 700 may return to block 702.

At block 705, the operations 700 may include receiving, from the computing entity, a request to initiate a session. The request to initiate the session may occur prior to or subsequent to execution of the authentication process at block 702 and determining that the identity is successfully authenticated at block 704. The request to initiate the session may be transmitted from the computing entity to an access control service.

At block 706, the operations 700 may include determining a set of one or more access policies corresponding to the identity associated with the computing entity. The identity associated with the computing entity may be determined based on authentication information obtained in connection with the authentication process. The current set of one or more access policies may be determined from an IAM system. In one example, to obtain the set of one or more access policies, the access control service may submit a query to the IAM system. The query may include an identification of the identity associated with the computing entity. The IAM system may execute the query upon an access policy data corpus that includes a set of access policies. The IAM system may return a query response to the access control system. The query response may include the current set of one or more access policies.

At block 708, the operations 700 may include executing an authorization process that includes determining, based on the set of access policies determined at block 706, a set of one or more actions that the computing entity is authorized to perform. The set of one or more actions that the computing entity is authorized to perform may be included in the set of access policies identified at block 706. The access control system may parse the set of access policies to determine the actions that the computing entity is authorized to perform.

In one example, determining the set of one or more actions that the computing entity is authorized to perform may include transmitting a query to an access policy evaluation engine. The query may include the identity associated with the computing entity. In response to the query, the authorization engine may determine a set of one or more access policies associated with a principal corresponding to the identity, for example, from an IAM system. The authorization engine may retrieve the one or more access policies and/or access policy information corresponding to the set of one or more access policies. The one or more access policies and/or access policy information retrieved by the authorization engine may be utilized to determine whether a computing entity is authorized to execute a requested action, for example, as described with reference to block 722 of FIG. 7B.

In one example, the operations 700 may include storing a permission set that includes the set of one or more actions that the computing entity is authorized to perform. In one example, the authorization engine may store the set of one or more actions that the computing entity is authorized to perform in a permission set repository. Determinations as to whether the computing entity is authorized to execute a requested action may be determined, for example, by the authorization engine, based at least in part on the permission set stored in the permission set repository. Additionally, or alternatively, the permission set stored in the permission set repository may include the one or more access policies, and determinations as to whether the computing entity is authorized to execute a requested action may be determined, for example, by the authorization engine, based at least in part on the permission set. In one example, determining whether the computing entity is authorized to execute the action based on the permission set stored in the permission set repository, as opposed to the set of access policies in the IAM system, may reduce the frequency of queries to the IAM system.

At block 710, the operations 700 may include initiating execution of the session. The session may be initiated by establishing a logical connection between the computing entity and one or more target resources. The session may be identified by a unique session identifier. The logical connection allows the computing entity to interact with the one or more target resources in accordance with the set of one or more actions that the computing entity is authorized to perform. The logical connection includes a secure pathway between the computing entity and the one or more target resources that enables the computing entity and the one or more target resources to securely interact with one another. The secure pathway may provide for encrypted communication to ensure the confidentiality, integrity, and authenticity of data as it travels between the computing entity and the one or more target resources. The session may include a set of one or more data transmissions occurring during a validity period for the authentication of the identity. The data transmissions may include the computing entity accessing the one or more target resources.

In one example, the operations 700 may include, while executing the session, executing at least a first action of a first set of one or more actions that the computing entity is authorized to perform. An action may be executed in response to receiving a request from the computing entity to execute the action and determining that the computing entity is authorized to execute the action. In one example, the set of access policies may be modified during the session such as subsequent to execution of at least the first action. In one example, the modification to the set of access policies may be determined by re-executing the authorization process while executing the session. After re-executing the authorization process, the computing entity may execute at least a second action of a second set of one or more actions that the computing entity is authorized to perform based on an updated set of access policies resulting from modification to the set of access policies. The second action and/or the second set of one or more actions may differ from the first action and/or the first set of one or more actions.

Referring to FIG. 7B, operations pertaining to determining whether the computing entity is authorized to execute an action based on the most-recently determined set of actions are further described. As shown in FIG. 7B, the operations 700 may include, at block 720, receiving a request from the computing entity to execute an action during a session. The request received at block 720 may originate from the computing entity, a user, a compute instance, a network entity, or a resource. The request may be transmitted via the logical connection established at block 710 (FIG. 7A). The request to execute the action may include a request to execute a set of one or more actions upon a target resource. The one or more actions may include at least one of: read, write, create, delete, update, modify, copy, move, rename, upload, or download.

At block 721, the operations 700 may include identifying the most-recently determined set of actions that the computing entity is authorized to perform. In one example, the most-recently determined set of actions that the computing entity is authorized to perform may include a set of actions determined by executing an authorization process in connection with initiating execution of a session, as described with reference to block 708 of FIG. 7A. Alternatively, the most-recently determined set of actions that the computing entity is authorized to perform may include a set of actions determined by re-executing the authorization process, as described with reference to block 734 of FIG. 7C.

At block 722, the operations 700 may include determining whether the computing entity is authorized to execute the action based on the most-recently determined set of actions that the computing entity is authorized to perform. The most-recently determined set of access actions, determined at block 708 and/or block 734, may be determined from the permission set stored in the permission set repository. When the computing entity is authorized to execute the action based on the most-recently determined set of actions, the operations 700 may include executing the action, at block 724. When the computing entity is not authorized to execute the action, the operations 700 may include refraining from executing the action, at block 726.

In one example, the operations 700 may include receiving a request from the computing entity to execute an action during a session, at block 720; determining that a trigger condition for re-executing the authorization process has not occurred, at block 730 (FIG. 7C); and in response to determining that the trigger condition for re-executing the authorization process has not occurred at block 730 (FIG. 7C), determining whether the computing entity is authorized to execute the action based on the set of actions previously determined at block 708 (e.g., in connection with initiating execution of a session) or at block 734 (e.g., in connection with a previous instance of re-executing the authorization process).

In one example, the action executed at block 724 may include at least one of: read, write, create, delete, update, modify, copy, move, rename, upload, or download. The operations may include executing a first action while executing the session and prior to re-executing the authorization process as well as executing a second action while executing the session and subsequent to re-executing the authorization process. The first action may be executed in response to receiving a first request from the computing entity to execute the first action. The second action may be executed in response to receiving a second request from the computing entity to execute the second action. The section request may be transmitted by the computing entity subsequent to the modification of the current set of access policies.

The determination as to whether the computing entity is authorized to execute the action may be based at least in part on the one or more access policies and/or access policy information retrieved by the authorization engine. In one example, the authorization engine may determine whether the computing entity is authorized to execute a requested action by validating the requested action against the permission set stored in the permission set repository. In one example, the access policy evaluation engine may determine that the computing entity is authorized to perform the action at least by executing a query upon the permission set repository. Additionally, or alternatively, the authorization engine may provide a response to the query indicating that the computing entity is currently authorized to execute the action based on the most-recently determined set of actions stored in the permission set repository and/or determined based on the information in the permission set repository. The operations 700 at block 724 may include executing the action responsive to successfully validating the requested action against the permission set, at block 722. In one example, the access control service may execute the action at block 724 based on a response from the authorization engine indicating that execution of the action is authorized. The operations 700 at block 726 may include refraining from executing the action responsive to an unsuccessful validation of the requested action against the permission set, at block 722. In one example, the access control service may refrain from executing the action at block 724 based on a response from the authorization engine indicating that execution of the action is unauthorized.

Referring to FIG. 7C, operations pertaining to re-executing an authorization process for determining the current set of actions that the computing entity is authorized to perform are further described. As shown in FIG. 7C, the operations 700 may include, at block 730, determining whether a trigger condition has occurred for re-executing the authorization process. In one example, the access control system may monitor for an occurrence of the trigger condition via monitoring software configured to detect the trigger condition. The monitoring software may continuously observe system states or inputs, and may check for an occurrence of the trigger condition. The monitoring software may include automation tools, rules engines, or logging mechanisms. The monitoring software may utilize various techniques such as polling, interrupts, or event queues to detect an occurrence of the trigger condition. Once a trigger condition is identified, the monitoring software may initiate a predetermined response, which may involve executing scripts, invoking callback functions, or triggering automation processes. When there is an occurrence of a trigger condition, the operations 700 may proceed to block 732. Alternatively, when a trigger condition has not occurred, the operations 700 may remain at block 730. In one example, the operations 700 may include periodically or intermittently determining whether a trigger condition has occurred for re-executing the authorization process. In one example, a trigger condition for re-executing the authorization process may include receiving a request from the computing entity to execute an action during the session, at block 720 of FIG. 7B.

At block 732, the operations 700 may include identifying a current set of one or more access policies corresponding to the identity associated with the computing entity. The current set of access policies may be identified by submitting a query to the IAM system, as described with reference to block 706 (FIG. 7A). The identity associated with the computing entity may be determined based on authentication information obtained previously in connection with the authentication process at block 702 (FIG. 7A). In one example, the identity credential and/or authentication information utilized when submitting the query to the IAM system may be stored in a cache memory and may be retrieved from the cache memory re-identifying a current set of one or more access policies. Upon having re-identified the current set of one or more access policies corresponding to the identity associated with the computing entity, the operations 700 may proceed to block 734.

At block 734, the operations 700 may include re-executing the authorization process based on the current set of access policies. The authorization process may be re-executed in the manner described with reference to block 708 (FIG. 7A). In one example, the current set of access policies may have changed since having been determined previously, such as at block 706 (FIG. 7A). Alternatively, the current set of access policies may be unchanged since having been determined previously. By re-execution of the authorization process, a determination as to whether the computing entity is currently authorized to execute a requested action, at block 722 of FIG. 7B, may be determined based on the current set of access policies, including any changes to the set of access policies since having been determined previously, such as at block 706 (FIG. 7A). Further, because the current set of one or more access policies are determined based on authentication information obtained previously in connection with the authentication process at block 702, the re-execution of the authorization process can be performed independent of any communication with the computing entity occurring subsequent to initiating execution of the session.

In one example, the occurrence of a trigger condition may be determined in response to the request from the computing entity to execute an action. Additionally, or alternatively, a trigger condition may occur independently from a request from the computing entity to execute an action. In one example, the trigger condition may include a period of time having elapsed since having last executed the authorization process. In one example, the operations 700 may include determining a time frequency to re-execute the authorization process and re-executing the authorization process upon one or more occurrences of the time frequency. The time frequency may be based on one or more parameters associated with at least one of: the session, the identity, the computing entity, or the second set of one or more actions that the computing entity is authorized to perform.

In one example, the operations 700 may include determining the trigger condition at least by applying a machine learning model to a dataset that includes a plurality of session data elements. Each session data element, of the plurality of session data elements, may correspond to at least one authentication process or at least one authorization process. The machine learning model may generate at least one output that includes the trigger condition. Additionally, or alternatively, the trigger condition may be determined based on the at least one output from the machine learning model. In one example, the operations may include receiving feedback corresponding to the session and updating the machine learning model based at least in part on the feedback. The feedback may include a set of data elements, and each data element, of the set of data elements, may correspond to one or more parameters associated with at least one of: the identity, the session, the computing entity, a series of requests from the computing entity to execute a set of actions, an authentication process for authenticating the identity, or the authorization process.

In one example, the set of access policies corresponding to the identity may be modified prior to the occurrence of the trigger condition. Additionally, or alternatively, the trigger condition may include modification of the set of access policies. The authorization process may be re-executed for the session, in response to detecting the occurrence of the trigger condition, based on the current set of access policies, as modified. In one example, re-executing the authorization process may include determining a second set of one or more actions that the computing entity is authorized to perform. The second set of one or more actions may differ from a first set of one or more actions that the computing entity was authorized to perform prior to modifying the set of access policies.

In one example, the current set of access policies may be associated with a first identity group that includes the identity associated with the computing entity. In one example, subsequent to executing the session, the identity may be removed from the first identity group, and re-executing the authorization process may include determining a second set of one or more actions that the computing entity is authorized to perform based on a second identity group that also includes the identity. In one example, the trigger condition may include the identity having been removed from the first identity group.

In one example, the second set of one or more actions that the computing entity is authorized to perform does not include the first action that the computing entity was authorized to perform prior to re-executing the authorization process. Additionally, while executing the session and subsequent to re-executing the authorization process, the operations 700 may include receiving a third request from the computing entity to execute the first action, determining, based on the second set of one or more actions, that the computing entity is not currently authorized to execute the first action, and refraining from executing the first action.

In one example, the operations 700 may include receiving authentication information that includes an identity associated with a computing entity. The identity may be authenticated by an authentication process prior to receiving the authentication information including the identity. The operations 700 may further include executing an authorization process with respect to the authentication information. The authorization process may include determining a first set of actions that the computing entity is authorized to perform. Subsequent to executing the authorization process, the operations 700 may include detecting an occurrence of a trigger condition for re-executing the authentication process as well as re-executing the authorization process based on the authentication information. In one example, re-executing the authorization process may include determining a second set of actions that the computing entity is authorized to perform, in which the second set of actions differs from the first set of actions. In one example, the authentication information may include an identity credential, or identity information determined based on the identity credential. In one example, the operations 700 may include obtaining at least a portion of the authentication information from a cache memory. Additionally, or alternatively, the operations 700 may include obtaining at least a portion of the authentication information from an access policy data corpus.

In one example, the operations 700 may include identifying a first set of one or more access policies associated with the identity and determining a first set of actions that the computing entity is authorized to perform based on the first set of one or more access policies. Additionally, or alternatively, the operations 700 may include identifying a second set of one or more access policies associated with the identity and determining the second set of actions that the computing entity is authorized to perform based on the second set of one or more access policies. In one example, the first set of one or more access policies may differ from the second set of one or more access policies with respect to one or more actions that the computing entity is authorized to perform.

In one example, re-executing the authorization process at block 734 may include determining that the computing entity is unauthorized to perform any action based on the current set of access policies. For example, all access policies corresponding to the identity associated with the computing entity may have expired and/or the access policy data corpus may include no access policies corresponding to the identity associated with the computing entity. In response to determining that the computing entity is unauthorized to perform any action based on the current set of access policies, the operations 700 may include terminating the session. Alternatively, in response to determining that the computing entity is unauthorized to perform any action based on the current set of access policies, the operations 700 may include maintaining the session. In one example, the session may be maintained even when the computing entity is not authorized to perform any action based on the current set of access policies. In one example, the computing entity may subsequently be authorized to perform one or more actions, for example, based on a new access policy or an update to the set of access policies corresponding to the identity associated with the computing entity. Additionally, or in the alternative, the set of access policies corresponding to the identity associated with the computing entity may allow one or more operations within a designated time window. The computing entity may be unauthorized to perform any actions outside of the designated time window, and the session may remain active during the period outside of the designated time window.

7. MISCELLANEOUS; EXTENSIONS

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions that, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions, which when executed by one or more hardware processors, cause performance of operations comprising:
    executing an authorization process for initiating a session with a computing entity, wherein executing the authorization process comprises:
        determining an identity associated with the computing entity;
        identifying a current set of access policies associated with the identity, wherein the current set of access policies comprises one or more access policies;
        determining, based on the current set of access policies, a first set of one or more actions that the computing entity is authorized to perform;
    initiating execution of the session in accordance with the current set of access policies,
        wherein the session comprises a set of one or more data transmissions occurring during a validity period for an authentication of the identity;
    while executing the session:
        executing a first action, of the first set of one or more actions, in response to (a) receiving a first request from the computing entity to execute the first action and (b) determining that the computing entity is currently authorized to execute the first action,
            wherein the current set of access policies is modified subsequent to execution of the first action;
        detecting an occurrence of a trigger condition for re-executing the authorization process based on the current set of access policies;
        responsive to detecting the occurrence of the trigger condition: re-executing the authorization process for the session based on the current set of access policies as modified subsequent to execution of the first action,
            wherein re-executing the authorization process comprises determining a second set of one or more actions that the computing entity is authorized to perform,
                wherein the second set of one or more actions differs from the first set of one or more actions.

2. The one or more non-transitory computer-readable media of claim 1, wherein the operations further comprise:
    while executing the session and subsequent to re-executing the authorization process:
        executing a second action, of the second set of one or more actions, in response to receiving a second request from the computing entity to execute the second action.

3. The one or more non-transitory computer-readable media of claim 1, wherein the operations further comprise:
    while executing the session and subsequent to re-executing the authorization process:
        receiving a third request from the computing entity to execute the first action, wherein the second set of one or more actions does not include the first action;
        determining, based on the second set of one or more actions, that the computing entity is not currently authorized to execute the first action;
        refraining from executing the first action.

4. The one or more non-transitory computer-readable media of claim 1,
    wherein the trigger condition comprises a particular period of time having passed since executing the authorization process;
    wherein re-executing the authorization process is responsive at least to determining the particular period of time has passed.

5. The one or more non-transitory computer-readable media of claim 1,
    wherein the occurrence of the trigger condition comprises detecting a modification of the current set of access policies.

6. The one or more non-transitory computer-readable media of claim 1, wherein re-executing the authorization process is performed independent of any communication with the computing entity occurring subsequent to initiating execution of the session.

7. The one or more non-transitory computer-readable media of claim 1,
    wherein the second set of one or more actions that the computing entity is authorized to perform is determined based on the identity associated with the computing entity,
    wherein the identity associated with the computing entity is determined in connection with an authentication process and prior to initiating execution of the session.

8. The one or more non-transitory computer-readable media of claim 1, wherein the operations further comprise:
    determining a time frequency with which to re-execute the authorization process;
    re-executing the authorization process upon one or more occurrences of the time frequency,
        wherein the time frequency is based on one or more parameters associated with at least one of: the session, the identity, the computing entity, or the second set of one or more actions that the computing entity is authorized to perform.

9. The one or more non-transitory computer-readable media of claim 1, wherein the operations further comprise:
    storing a first permission set, wherein the first permission set comprises the first set of one or more actions that the computing entity is authorized to perform,
    validating the first request from the computing entity against the first permission set, and
    executing the first action responsive to successfully validating the first request against the first permission set.

10. The one or more non-transitory computer-readable media of claim 9, wherein the operations further comprise:
    determining, at least by re-executing the authorization process, a modification of the current set of access policies;
    responsive to determining the modification of the current set of access policies:
        storing a second permission set, wherein the second permission set comprises the second set of one or more actions that the computing entity is authorized to perform, wherein the second permission set replaces the first permission set,
further executing the session, wherein further executing the session comprises:
receiving, from the computing entity, a second request to execute a second action,
validating the second request against the second permission set, and
executing the second action responsive to successfully validating the second request against the second permission set.

11. The one or more non-transitory computer-readable media of claim 1,
wherein the trigger condition comprises a second request from the computing entity to execute a second action, wherein the second action differs from the first action.

12. The one or more non-transitory computer-readable media of claim 1,
wherein the trigger condition comprises a change in one or more parameters associated with at least one of: the session, the computing entity, or a series of requests from the computing entity to execute a set of actions.

13. The one or more non-transitory computer-readable media of claim 1, wherein the operations further comprise:
determining the trigger condition at least by applying a machine learning model to a dataset comprising a plurality of session data elements,
wherein each session data element, of the plurality of session data elements, corresponds to at least one authentication process or at least one authorization process,
wherein the machine learning model generates at least one output, wherein the at least one output comprises the trigger condition or wherein the trigger condition is based on the at least one output.

14. The one or more non-transitory computer-readable media of claim 13, wherein the operations further comprise:
receiving feedback corresponding to the session; and
updating the machine learning model based at least in part on the feedback;
wherein the feedback comprises a set of data elements, wherein each data element, of the set of data elements, corresponds to one or more parameters associated with at least one of:
the identity, the session, the computing entity, a series of requests from the computing entity to execute a set of actions, an authentication process for authenticating the identity, or the authorization process.

15. The one or more non-transitory computer-readable media of claim 1, wherein the operations further comprise:
executing an authentication process, wherein the authentication process comprises authenticating the identity associated with the computing entity.

16. The one or more non-transitory computer-readable media of claim 15, wherein the operations further comprise:
prior to executing the authentication process, receiving authentication information, wherein the authentication information comprises the identity;
executing the authentication process at least by utilizing the authentication information to authenticate the identity associated with the computing entity;
storing the authentication information in a cache memory; and
re-executing the authorization process based at least on the authentication information in the cache memory.

17. The one or more non-transitory computer-readable media of claim 1, wherein the session comprise an open socket session, wherein the open socket session comprises a connection between the computing entity and a target resource, wherein the first action comprises receiving, at the computing entity, target data from the target resource.

18. The one or more non-transitory computer-readable media of claim 1,
wherein the current set of access policies are associated with a first identity group, wherein the first identity group comprises the identity;
wherein subsequent to executing the session, the identity is removed from the first identity group;
wherein re-executing the authorization process comprises determining the second set of one or more actions that the computing entity is authorized to perform based on a second identity group, wherein the second identity group comprises the identity.

19. The one or more non-transitory computer-readable media of claim 18, wherein the trigger condition comprises the identity having been removed from the first identity group.

20. A method, comprising:
executing an authorization process for initiating a session with a computing entity, wherein executing the authorization process comprises:
determining an identity associated with the computing entity;
identifying a current set of access policies associated with the identity, wherein the current set of access policies comprises one or more access policies;
determining, based on the current set of access policies, a first set of one or more actions that the computing entity is authorized to perform;
initiating execution of the session in accordance with the current set of access policies
wherein the session comprises a set of one or more data transmissions occurring during a validity period for an authentication of the identity;
while executing the session:
executing a first action, of the first set of one or more actions, in response to (a) receiving a first request from the computing entity to execute the first action and (b) determining that the computing entity is currently authorized to execute the first action,
wherein the current set of access policies is modified subsequent to execution of the first action;
detecting an occurrence of a trigger condition for re-executing the authorization process based on the current set of access policies;
responsive to detecting the occurrence of the trigger condition: re-executing the authorization process for the session based on the current set of access policies as modified subsequent to execution of the first action,
wherein re-executing the authorization process comprises determining a second set of one or more actions that the computing entity is authorized to perform,
wherein the second set of one or more actions differs from the first set of one or more actions;
wherein the method is performed by at least one device including a hardware processor.

21. A system, comprising:
at least one hardware processor;
wherein the system is configured to execute operations, using the at least one hardware processor, the operations comprising:

executing an authorization process for initiating a session with a computing entity, wherein executing the authorization process comprises:
  determining an identity associated with the computing entity;
  identifying a current set of access policies associated with the identity, wherein the current set of access policies comprises one or more access policies;
  determining, based on the current set of access policies, a first set of one or more actions that the computing entity is authorized to perform;
initiating execution of the session in accordance with the current set of access policies,
  wherein the session comprises a set of one or more data transmissions occurring during a validity period for an authentication of the identity;
while executing the session:
  executing a first action, of the first set of one or more actions, in response to (a) receiving a first request from the computing entity to execute the first action and (b) determining that the computing entity is currently authorized to execute the first action,
    wherein the current set of access policies is modified subsequent to execution of the first action;
  detecting an occurrence of a trigger condition for re-executing the authorization process based on the current set of access policies;
  responsive to detecting the occurrence of the trigger condition: re-executing the authorization process for the session based on the current set of access policies as modified subsequent to execution of the first action,
    wherein re-executing the authorization process comprises determining a second set of one or more actions that the computing entity is authorized to perform,
      wherein the second set of one or more actions differs from the first set of one or more actions.

22. One or more non-transitory computer-readable media storing instructions, which when executed by one or more hardware processors, cause performance of operations comprising:
  receiving authentication information comprising an identity associated with a computing entity, wherein the identity has been authenticated by an authentication process;
  executing an authorization process with respect to the authentication information,
    wherein the authorization process comprises determining a first set of actions that the computing entity is authorized to perform;
  detecting an occurrence of a trigger condition for re-executing the authorization process;
  re-executing the authorization process based on the authentication information comprising the identity associated with the computing entity,
    wherein re-executing the authorization process comprises determining a second set of actions that the computing entity is authorized to perform,
    wherein the second set of actions differs from the first set of actions.

23. The one or more non-transitory computer-readable media of claim 22, wherein the authentication information comprises at least one of: an identity credential, or identity information determined based on the identity credential.

24. The one or more non-transitory computer-readable media of claim 22, wherein operations further comprise at least one of:
  obtaining at least a portion of the authentication information from a cache memory; or
  obtaining at least a portion of the authentication information from an access policy data corpus.

25. The one or more non-transitory computer-readable media of claim 22, wherein operations further comprise:
  identifying a first set of one or more access policies associated with the identity, and determining the first set of actions that the computing entity is authorized to perform based on the first set of one or more access policies; and
  identifying a second set of one or more access policies associated with the identity, and determining the second set of actions that the computing entity is authorized to perform based on the second set of one or more access policies;
  wherein the first set of one or more access policies differs from the second set of one or more access policies with respect to one or more actions that the computing entity is authorized to perform.

* * * * *